March 17, 1931.  L. L. DA COSTA  1,796,443

FLOAT CONTROLLED VALVE

Filed July 13, 1928

INVENTOR.
LEO L. DA COSTA
BY
George D. Richards
ATTORNEY

Patented Mar. 17, 1931

1,796,443

UNITED STATES PATENT OFFICE

LEO L. DA COSTA, OF IRVINGTON, NEW JERSEY, ASSIGNOR TO DA COSTA COFFEE CORPORATION, OF NEW YORK, N. Y., A CORPORATION OF DELAWARE

FLOAT-CONTROLLED VALVE

Application filed July 13, 1928. Serial No. 292,380.

The present invention relates, generally, to valves; and the invention has reference, more particularly to a novel construction of float controlled feed valve for automatically supplying replenishing liquid to a tank or reservoir.

The invention has for its principal object to provide a novel construction of float controlled feed valve, and the like, which serves not only to automatically supply replenishing liquid such as water to a reservoir, but which also is adapted to admit this liquid in extremely small quantities or in larger quantities as required, to thereby maintain a substantially constant liquid head in the reservoir under all operating conditions and at all times.

The invention has for a further object to provide, in connection with a feed valve, a cam operated ball for regulating the flow of replenishing liquid, the movement of said ball being proportional to the fall in liquid level in the reservoir.

Other objects of the present invention, not at this time more particularly enumerated, will be clearly understood from the following detailed description of the same.

With the various objects of the present invention in view, the same consists, primarily, in the novel float controlled feed valve, and the like, hereinafter set forth; and the invention consists, furthermore, in the various arrangements and combinations of the several devices and parts, as well as in the details of construction of the same, all of which will be more fully described in the following specification, and then finally embodied in the claims which are appended thereto.

The invention is clearly illustrated in the accompanying drawings, in which:—

Similar characters of reference are employed in all of the hereinabove described views, to indicate corresponding parts.

Figure 1:
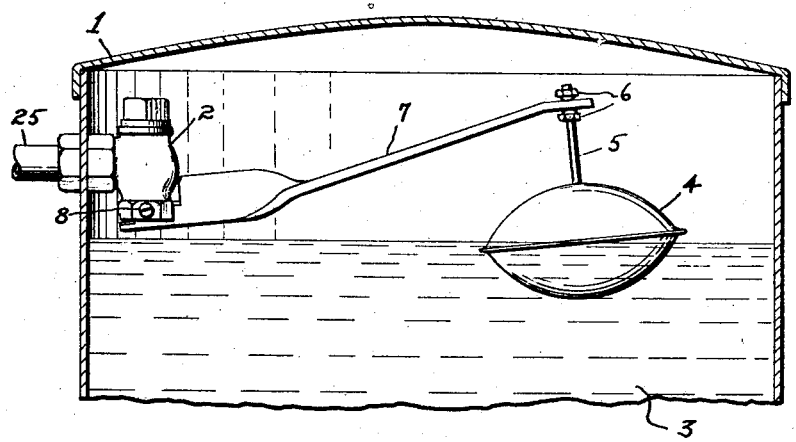
Fig. 1 is a sectional view of a tank or reservoir containing liquid and equipped with the novel float controlled feed valve of this invention.
Figure 2:
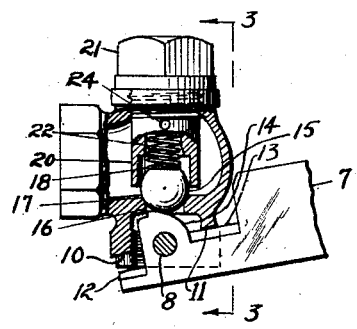
Fig. 2 is an enlarged view with parts broken away of the feed valve shown in Fig. 1, the valve being illustrated in its fully closed position.
Figure 3:
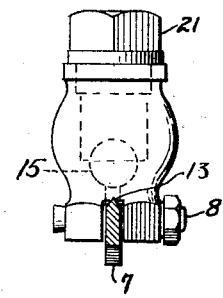
Fig. 3 is a view taken along the line 3—3 of Fig. 2.

Referring now to the said drawings, the reference numeral 1 designates a reservoir or tank such as a hot water reservoir used in conjunction with a coffee urn for supplying hot water in the making of coffee. The reservoir 1 is provided with a float controlled feed valve 2 which automatically maintains the reservoir filled with hot water or other liquid 3. As liquid is withdrawn from the lower portion of reservoir 1, the feed valve 2 operates to supply fresh liquid to the reservoir to thereby maintain a constant head of liquid in the reservoir. Although the feed valve is illustrated in conjunction with a hot water reservoir it is to be understood that the invention is not limited thereto, but may be employed wherever it is desired to maintain a constant head of liquid in a reservoir.

A float 4 having a shank 5 is operatively connected by means of nuts 6 to the free end of an operating lever 7. Operating lever 7 is fulcrumed upon a screw 8 that is carried by the lower portion of the feed valve 2. This lower portion of the feed valve 2 is annular in form and has apertures in its opposite walls for receiving the end portions of the screw 8. The walls of the lower portion of the feed valve 2 are cut away to provide aligned slots extending at right angles to the screw 8, which slots receive portions of lever 7. The bottoms of these slots constitute stops 10 and 11 for limiting the movement of the operating lever 7. Operating lever 7 is cut away at opposite sides of its fulcrum point to provide knife like stop portions 12 and 13. The stop portions 12 and 13 are adapted to abut against the stops 10 and 11 respectively, to thereby limit the movement of the operating lever during the opening and closing of the feed valve. An integral cam 14 is formed on lever 7 intermediate the stop members 12 and 13. Cam 14 is in operative engagement with a spring pressed ball 15 that projects downwardly within a vertical outlet aperture 16 provided in the feed valve 2. The upper portion of the wall of outlet aperture 16 is beveled to provide an annular valve seat 17. The ball 15 is adapted to cooperate with the valve seat 17, to effect the opening and closing of the feed valve. A coil compression spring 18 tends to urge the ball 15 downwardly against the seat 17 to thereby shut off the flow of liquid into the reservoir 1. This spring both serves to hold the ball against vibratory displacement, and also seats the same with sufficient pressure to prevent deposits being formed on the seat due to presence of lime or other substances which may be present in solution with the controlled liquid. A depending annular apron 20, provided on a plug member 21, surrounds the ball 15 and confines the motion of this ball to substantially a vertical direction. The lower end of apron 20 is spaced from the valve seat 17 so as to permit the flow of liquid past this seat and through the outlet aperture 16. The plug member 21 is provided with a central recess 22 that snugly receives the spring 18. Radial apertures 24 extend through the wall of the plug member 21 and establish communication between the recess 22 and the exterior of the plug member. The plug member 21 is threaded through an aperture in the upper portion of the body of the feed valve 2. The body of the feed valve 2 is provided with an inlet aperture into which the supply pipe 25 is threaded.

In operation, assuming the tank 1 to be filled to the desired height as illustrated in Fig. 1, the float 4 is in its highest position and supports the operating lever 7 in its upper position with stop portion 13 abutting the stop 11. In this upper position of the operating lever, the cam 14 just touches but does not push upwardly against the ball 15, so that this ball is retained in engagement with the valve seat 17 by spring 18, thereby preventing the flow of supply liquid from pipe 25 through the feed valve and into tank 1.

Figure 4:
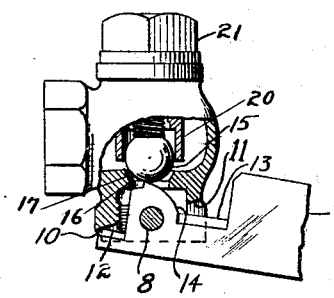
Fig. 4 is a view similar to Fig. 2, but illustrates the feed valve in its fully open position.

Should liquid be withdrawn from the tank 1, the upper liquid surface in the tank 1 will descend, causing the float 4 to likewise move downwardly, acting under its own weight and that of the operating lever 7. This downward movement of float 4 causes operating lever 7 to swing downwardly about the pivotal screw 8, and the stop portion 13 disengage stop 11. As the lever 7 swings downwardly, it causes the cam 14 to turn about the pivotal screw 8. As cam 14 commences to turn, it exerts an upward pressure against the ball 15, and overcoming the tension of spring 18 causes this ball to move upwardly at a rate depending upon the rapidity of motion of lever 7. Thus, as soon as the liquid surface level in tank 1 commences to fall, the cam 14 causes the ball 15 to move upwardly off of its valve seat 17 a proportional amount, to thereby admit liquid through the outlet aperture 16 into the tank 1 to replenish the liquid that has been withdrawn from this tank and thus to reestablish the original liquid level. The more the liquid surface level drops, the more will ball 15 be lifted from its valve seat 17, thereby admitting a greater and greater flow of liquid through the feed valve into the reservoir. Should the operating lever 7 swing downwardly to such an extent as to cause its stop portion 12 to engage the stop 10, then the movement of this lever and that of the cam 14 will be brought to an end and the feed valve 2 will be in its fully open position as illustrated in Fig. 4. In this fully open position of the feed valve, the ball 15 is at the upper limit of its travel and replenishing liquid flows rapidly between this ball and its seat and into tank 1. As this replenishing liquid raises the liquid level in the reservoir the float 4 rises, causing the operating lever to swing upwardly and effect the gradual closure of the ball 15 upon its valve seat 17. When the liquid level has regained its normal position the ball 15 engages the seat 17 shutting off the supply of liquid to the tank 1.

It will be noted that as soon as the liquid level in the reservoir tends to fall, the ball 15 is lifted from its seat to thereby admit fresh liquid so as to maintain a substantially constant liquid level in the reservoir. This is important, not only because it is desired to keep the reservoir constantly filled but also because it is desirable to maintain a constant head of liquid in the reservoir. By maintaining a constant head of liquid in the reservoir, when a discharge opening such as a faucet is operated, a predetermined rate of flow of liquid takes place so that it is known that in a certain period of time a definite quantity of liquid will be delivered. Also, in the event that the liquid in the reservoir is hot water as used for example in connection with a copper urn, by thus maintaining the liquid level substantially constant at all times, the inrush of cold replenishing water comes in small quantities so as not to materially affect the temperature of the bulk of hot water in the reservoir. In other words, while a cup of hot water is being drawn off, a cup of cold water is being admitted to the reservoir so that the water in the reservoir retains a substantially constant desirable temperature.

It will be noted that the novel float controlled feed valve of this invention is of simple construction, consisting of but a few rugged parts, which enables it to be cheaply manufactured and is admirably suited for use whenever a constant liquid head is desired. Also the absence of lost motion between the float 4 and the ball 15 insures reliable and prompt operation of this valve to effect a constant liquid head.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A feed valve comprising a body having inlet and outlet openings, said outlet opening having a tapered annular valve seat, a ball cooperating with said valve seat for closing said outlet opening, a float controlled operating lever fulcrumed on said body, said lever having stop portions on opposite sides of its fulcrum point, a cam provided upon said lever intermediate said stop portions and contacting with said ball, said cam, upon movement of said lever in one direction, acting to lift said ball to varying distances from said outlet opening, depending upon the extent of movement of said lever, and said ball upon movement of said lever in the reverse direction acting to move with said cam to effect the closing of said outlet opening, said stop portions contacting with said body to limit the movement of said lever in opposite directions.

2. A feed valve comprising, a body having inlet and outlet openings, a pivot member carried by said body, stops provided on said body at opposite sides of said pivot member, said stops being formed by the bottoms of aligned recesses in said body, a spherical valve member arranged to contact with said outlet opening, a lever fulcrumed on said pivot and having stop portions at opposite sides of said pivot, said stop portions being arranged to contact with said stops to thereby limit the motion of said lever, a cam formed on said lever above said pivot member and intermediate said stop portions and contacting with said valve member, said cam upon movement of said lever effecting a corresponding movement of said valve member, to thereby regulate the flow of liquid through said feed valve in proportion to the extent of movement of said lever, a plug projecting into said body above said valve member and having an apron for guiding the latter in its movement, and spring means within said plug and engaging said valve member for urging the same toward closed position.

In testimony that I claim the invention set forth above I have hereunto set my hand this 10th day of July, 1928.

LEO L. DA COSTA.